US008134623B2

(12) United States Patent
Purcell et al.

(10) Patent No.: US 8,134,623 B2
(45) Date of Patent: *Mar. 13, 2012

(54) ANALOG-TO-DIGITAL CONVERSION IN IMAGE SENSORS USING A DIFFERENTIAL COMPARISON

(75) Inventors: Matthew Purcell, Edinburgh (GB); Graeme Storm, Forres (GB); Min Qu, Shanghai (CN)

(73) Assignee: STMicroelectronics (Research & Development) Ltd., Buckinghamshire Marlow (GB)

( * ) Notice: Subject to any disclaimer, the term of this patent is extended or adjusted under 35 U.S.C. 154(b) by 283 days.

This patent is subject to a terminal disclaimer.

(21) Appl. No.: 12/402,397

(22) Filed: Mar. 11, 2009

(65) Prior Publication Data
US 2009/0237536 A1 Sep. 24, 2009

(30) Foreign Application Priority Data
Mar. 21, 2008 (EP) .................................... 08153179

(51) Int. Cl.
*H04N 3/14* (2006.01)
*H04N 5/335* (2006.01)
(52) U.S. Cl. ......................... 348/301; 348/300; 348/294
(58) Field of Classification Search .................. 348/245, 348/294, 300, 301
See application file for complete search history.

(56) References Cited

U.S. PATENT DOCUMENTS

| | | | |
|---|---|---|---|
| 5,132,801 A * | 7/1992 | Yamano ......................... | 348/245 |
| 5,268,764 A * | 12/1993 | Kihara et al. ................. | 348/245 |
| 5,585,652 A * | 12/1996 | Kamasz et al. ............... | 257/231 |
| 5,659,355 A * | 8/1997 | Barron et al. ................. | 348/245 |
| 6,919,551 B2 * | 7/2005 | Barna et al. ............... | 250/214 R |
| 2002/0118289 A1* | 8/2002 | Choi ............................. | 348/308 |
| 2004/0046685 A1* | 3/2004 | Yun et al. ...................... | 341/169 |
| 2005/0092895 A1 | 5/2005 | Fossum | |
| 2005/0206752 A1 | 9/2005 | Lim | |
| 2007/0008206 A1* | 1/2007 | Tooyama et al. ............. | 341/155 |
| 2008/0192126 A1* | 8/2008 | Purcell et al. ............. | 348/222.1 |
| 2008/0284885 A1* | 11/2008 | Taura ............................ | 348/300 |
| 2009/0231479 A1* | 9/2009 | Zarnowski et al. ........... | 348/302 |
| 2010/0110231 A1* | 5/2010 | Funabashi ..................... | 348/234 |
| 2010/0157035 A1* | 6/2010 | Purcell et al. .................. | 348/65 |

FOREIGN PATENT DOCUMENTS

| | | |
|---|---|---|
| EP | 1742369 A2 | 1/2007 |
| EP | 1874040 A2 | 1/2008 |
| WO | WO-2007135161 A1 | 11/2007 |

OTHER PUBLICATIONS

European Search Report for Application No. 08153179, dated Jun. 26, 2008.

* cited by examiner

*Primary Examiner* — Lin Ye
*Assistant Examiner* — Chia-Wei A Chen
(74) *Attorney, Agent, or Firm* — Gardere Wynne Sewell LLP

(57) ABSTRACT

An image sensor has a per-column ADC arrangement including first and second capacitors for correlated double sampling, and a comparator circuit. The capacitors are continuously connected to, respectively, the analog pixel signal and a ramp signal without use of a hold operation. The comparator circuit comprises a differential amplifier having one input connected to the junction of the two capacitors and another input connected to a reference signal. The reference signal is preferably sampled and held from a reference voltage. The use of a differential amplifier as first stage of the comparator addresses problems arising from ground voltage bounce when a large pixel array images a scene with low contrast.

18 Claims, 2 Drawing Sheets

ANALOG-TO-DIGITAL CONVERSION IN IMAGE SENSORS USING A DIFFERENTIAL COMPARISON

PRIORITY CLAIM

The present application claims the benefit of European Application for Patent No. 08153179 filed Mar. 21, 2008 entitled "Analog-to-Digital Converter in Image Sensors", the disclosure of which is hereby incorporated by reference to the maximum extent allowable by law.

BACKGROUND OF THE INVENTION

1. Technical Field of the Invention

The present invention relates to analog-to-digital conversion (ADC) in an image sensor.

2. Description of Related Art

In common forms of an image sensor, a two-dimensional array of pixels is read out row by row, the pixels of each column sharing column readout circuitry which commonly comprises correlated double sampling and ADC.

SUMMARY OF THE INVENTION

In an embodiment, an image sensor has a pixel array and comprises: a correlated double sample circuit comprising a first input for receiving an analog signal from a pixel of the pixel array, the signal varying during a pixel readout period and having a first level during a first reset period and a second level during a second read period, a second input for receiving a time variant reference signal, and two sample capacitors; and a comparator circuit that compares the time variant reference signal and the analog signal; wherein the analog signal from the pixel and the time variant reference signal are constantly read onto one of the two sample capacitors respectively of the correlated double sample circuit during both the first reset period and the second read period; and wherein the comparator circuit comprises a differential amplifier having one input receiving the combination of the analog pixel signal and the time variant reference signal, and a second input receiving a fixed reference signal.

The use of a differential amplifier as first stage of the output circuit reduces the effect of ground bounce and hence reduces x-droop.

The differential amplifier is typically a long tail pair.

Preferably the output of the differential amplifier is connected to an inverter via a further capacitor.

The fixed reference signal is preferably provided by sampling and holding a reference voltage, said sampling being performed during autozeroing of the pixel array. This eliminates the effect of any noise present in the reference voltage.

The image sensor is particularly suitable to be incorporated in a mobile device; for example a mobile phone having a camera, a personal digital assistant having a camera, a digital camera, an optical pointing device, (such as an optical mouse), an endoscope apparatus, or an ambient light sensor.

In another embodiment, a method is provided for converting an analog signal from an image sensor pixel, during a pixel readout period to a digital signal using an analog to digital converter circuit. The analog to digital converter comprises a correlated double sample circuit having first and second sample capacitors, a time varying reference circuit enabled to provide a time varying reference signal, the first sample capacitor being continuously connected to the time varying reference circuit and the second sample capacitor being continuously connected to the pixel during the pixel readout period. The method comprises: (i) resetting the pixel, thereby sampling an analog signal equivalent to a pixel reset voltage onto the second capacitor; (ii) removing the pixel from reset, wherein the analog signal is corrected for pixel reset noise on the second capacitor; (iii) integrating light received on the pixel, wherein the analog signal is reduced according to the amount of light received; (iv) providing the time varying reference signal; (v) comparing the analog signal with the time varying reference signal; and (vi) outputting an output signal when the time variant reference signal corresponds to the analog signal. Further; said comparing is effected by applying the combination of the analog pixel signal and the time variant reference signal to one input of a differential amplifier, and applying a fixed reference signal to the other input of the differential amplifier.

BRIEF DESCRIPTION OF THE DRAWINGS

Other features and advantages will become clear in the description which follows of several non-limiting examples, with reference to the attached drawings wherein.

DETAILED DESCRIPTION OF THE DRAWINGS

Figure 1:
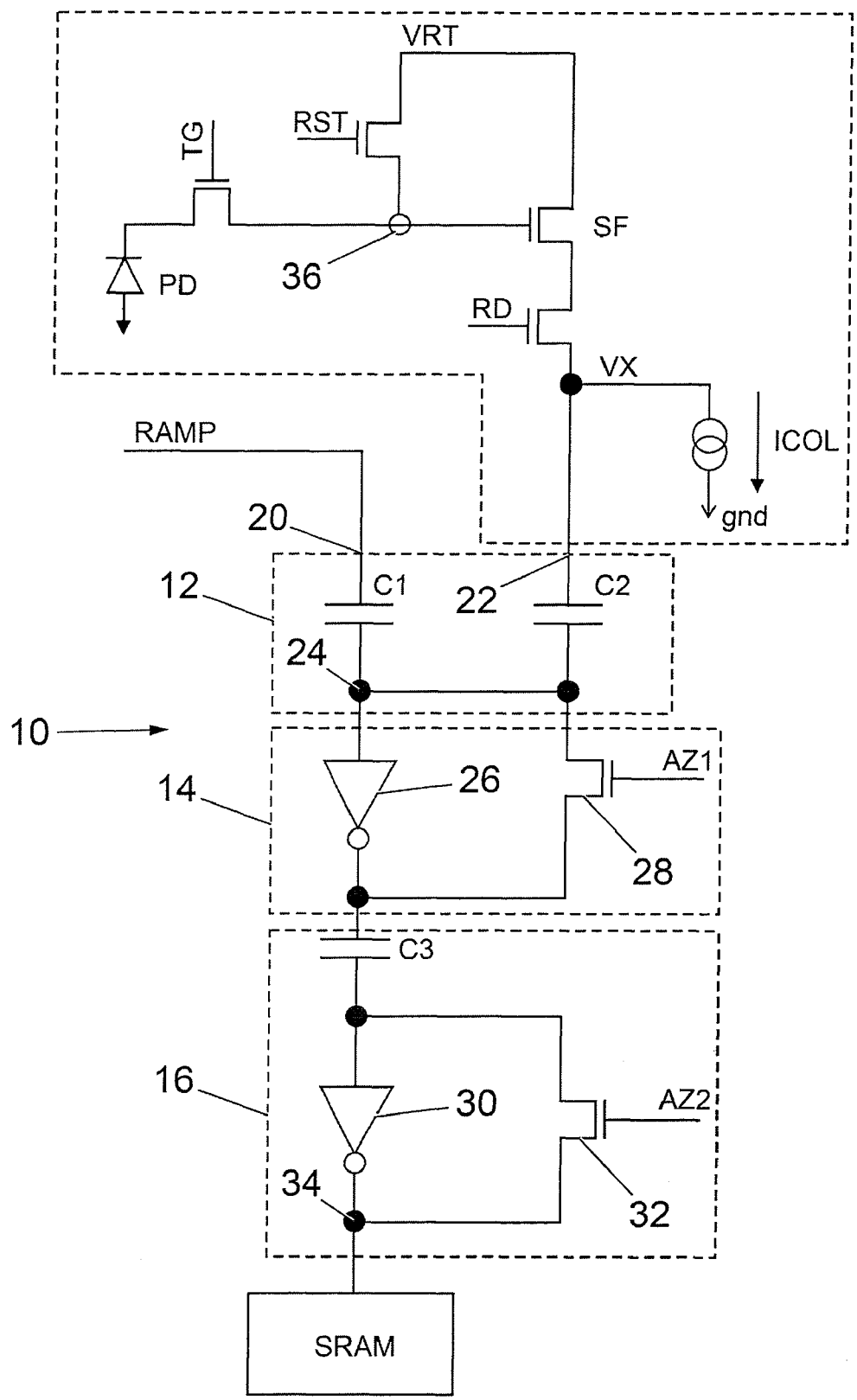
FIG. 1 is a schematic diagram of an embodiment of an ADC circuit as also described in unpublished European Patent Application 07101955.8.

Unpublished (at the time of filing the priority application) European Patent Application 07101955.8 discloses an ADC arrangement for an image sensor, one embodiment of which is shown in FIG. 1 of the present application. The structure and operation of this arrangement will be briefly described with reference to FIG. 1.

An analog to digital converter ADC 10 comprises a correlated double sampling (CDS) circuit 12 and a comparator, the comparator comprising an inverter circuit 14 and an output circuit 16. The input 22 to the CDS circuit 12 is from the column output line of a pixel array, one pixel being shown at 18 by way of example.

The CDS 12 comprises, in this example, a first capacitor C1 connected to a first input 20 and a second capacitor C2 connected to a second input 22. The first input 20 is connected to a ramp generator RAMP, which generates an appropriate time varying reference signal when required by the control means. The value of the time varying reference signal being known by the control means at any given time. The second input 22 is connected to the output of the pixel 18. The first and second capacitors C1, C2 are also connected to a CDS output node 24.

The inverter circuit 14, which could be a CMOS, NMOS or PMOS type inverter, comprises a first inverter 26 and, on a feedback loop from the output of the first inverter 26, a first transistor 28. The first transistor 28, in this instance, operates as a switch and is activated by a signal AZ1 from the control means.

The output circuit 16 comprises a third capacitor C3, connected to the output of the inverter circuit 14, a second inverter 30 and, on a feedback loop from the output of the second inverter 30, a second transistor 32. The second transistor 32, in this instance, operates as a switch and is activated by a signal AZ2 from the control means. The output circuit 16 stores the value of the pixel 18 in a memory SRAM.

The comparator (inverter circuit 14 and an output circuit 16) can be described as a summing comparator, in that it adds the two input values RAMP and VX. If RAMP+VX is greater than zero, the output of the comparator goes high, and, if RAMP+VX is less than zero, the output of the comparator goes low, where zero for RAMP is the value of RAMP when VX(black) is measured and zero for VX is VX(black).

The arrangement of FIG. 1 was devised to mitigate sample and hold noise caused by sample and hold capacitors of a correlated double sample circuit, more commonly known as kT/C noise, and means that to reduce noise by two, capacitor size requires to go up by four. As such, size or noise limits are placed on the design of the image sensor. In the arrangement of FIG. 1, the kT/C noise of the sample capacitors, C1 and C2, is mitigated by removing the requirement to hold. That is, the capacitors C1 and C2 are continuously connected to the ramp generator and VX respectively and, as such, there is a less kT/C noise generated than if a hold operation was performed. This allows C1 and C2 to be reduced in size.

Although this arrangement provides advantages over the prior art, it has been found to have some deficiencies when applied to large arrays and/or high speeds. This arises particularly where the scene being imaged is "flat", that is one with little contrast. In this situation, a large number of inverters fire at the same time; this causes a lot of current to pass through the ground plane which in turn causes the ground plane voltage to rise. The rise in ground plane voltage affects column capacitors differently across the x-direction of the array, causing an effect in the resulting image sometimes referred to as "x-droop". This can be counteracted by using wide power tracks, but such an approach is not area efficient in larger arrays.

A need exists to provide an ADC arrangement which overcomes this problem while retaining the advantages of the prior arrangement in relation to a combination of simplicity, good performance, and efficient use of area.

Figure 2:
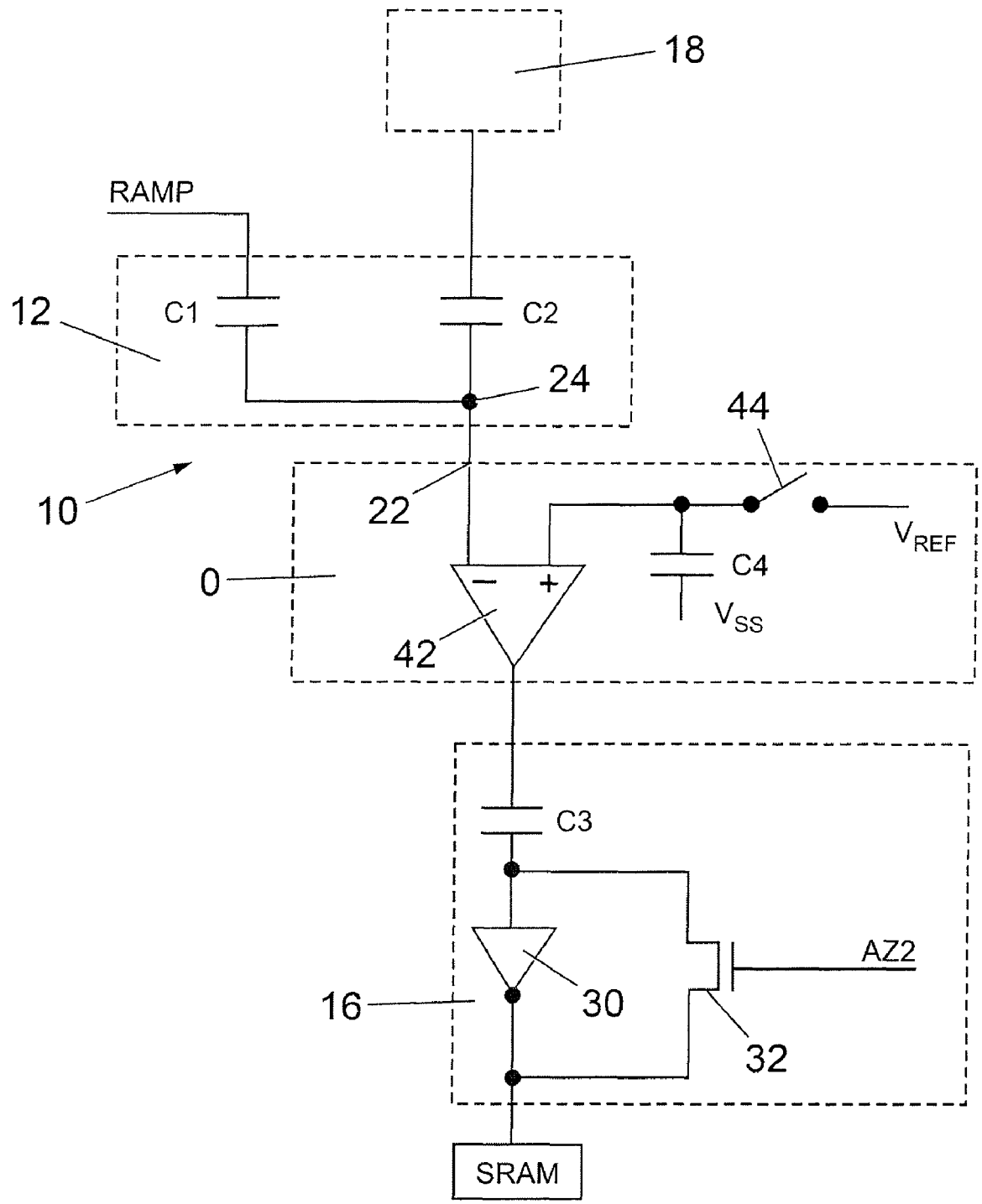
FIG. 2 is a schematic of an embodiment of an ADC circuit.

Referring now to FIG. 2 (in which the pixel 18 has been omitted for simplicity), the inverter circuit 14 is replaced by a circuit 40 which comprises a differential amplifier 42, which will typically be a long tail pair, receiving the output of capacitors C1 and C2 at one input terminal. The differential amplifier is autobiased at the other input terminal by a reference voltage Vref. In order to eliminate line noise artifacts, which would be introduced by a noisy reference voltage, the reference voltage is sampled and learned during autozeroing of the pixel array; this is accomplished by a switch 44 (which will typically be a transistor) closing to sample Vref onto a capacitor C4.

The use of a differential amplifier as the first stage makes the output circuit more resistant to ground bounce, leading to a reduction in x-droop.

The circuitry of FIG. 2 can be implemented within any of the following types of devices: a mobile phone; a personal digital assistant; a digital camera; an optical pointing device such as an optical mouse; an endoscope apparatus; and an ambient light sensor.

Although preferred embodiments of the method and apparatus have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A circuit, comprising:
   a correlated double sample circuit comprising a first input for receiving an analog signal from a pixel of a pixel array, the signal varying during a pixel readout period and having a first level during a first reset period and a second level during a second read period, a second input for receiving a time variant reference signal, and two sample capacitors; and
   a comparator circuit that compares the time variant reference signal and the analog signal;
   wherein the analog signal from the pixel and the time variant reference signal are constantly read onto one of the two sample capacitors respectively of the correlated double sample circuit during both the first reset period and the second read period; and
   wherein the comparator circuit comprises a differential amplifier having one input receiving the combination of the analog pixel signal and the time variant reference signal, and a second input receiving a fixed reference signal.

2. The circuit according to claim 1, in which the differential amplifier is a long tail pair.

3. The circuit according to claim 1, in which an output of the differential amplifier is connected to an inverter via a further capacitor.

4. The circuit according to claim 1, in which the fixed reference signal is provided by sampling and holding a reference voltage, said sampling being performed during autozeroing of the pixel array.

5. A device comprising:
   an image sensor array including pixel element;
   a correlated double sample circuit comprising a first input for receiving an analog signal from the pixel element, the signal varying during a pixel readout period and having a first level during a first reset period and a second level during a second read period, a second input for receiving a time variant reference signal, and two sample capacitors; and
   a comparator circuit that compares the time variant reference signal and the analog signal;
   wherein the analog signal from the pixel and the time variant reference signal are constantly read onto one of the two sample capacitors respectively of the correlated double sample circuit during both the first reset period and the second read period; and
   wherein the comparator circuit comprises a differential amplifier having one input receiving the combination of the analog pixel signal and the time variant reference signal, and a second input receiving a fixed reference signal.

6. The device as claimed in claim 5, wherein the device is a mobile phone having a camera including the image sensor array.

7. The device as claimed in claim 5, wherein the device is a personal digital assistant having a camera including the image sensor array.

8. The device as claimed in claim 5, wherein the device is a digital camera.

9. The device as claimed in claim 5, wherein the device is an optical pointing device such as an optical mouse.

10. The device as claimed in claim 5, wherein the device is an endoscope apparatus including the image sensor array.

11. The device as claimed in claim 5, wherein the device is an ambient light sensor.

12. A method of converting an analog signal from an image sensor pixel, during a pixel readout period to a digital signal using an analog to digital converter circuit comprising a correlated double sample circuit having first and second sample capacitors, a time varying reference circuit enabled to provide a time varying reference signal, the first sample capacitor being continuously connected to the time varying reference circuit and the second sample capacitor being continuously connected to the pixel during the pixel readout period, the method comprising:
- (i) resetting the pixel, thereby sampling an analog signal equivalent to a pixel reset voltage onto the second capacitor;
- (ii) removing the pixel from reset, wherein the analog signal is corrected for pixel reset noise on the second capacitor;
- (iii) integrating light received on the pixel, wherein the analog signal is reduced according to the amount of light received;
- (iv) providing the time varying reference signal;
- (v) comparing the analog signal with the time varying reference signal; and
- (vi) outputting an output signal when the time variant reference signal corresponds to the analog signal;

wherein: said comparing is effectuated by applying the combination of the analog pixel signal and the time variant reference signal to one input of a differential amplifier, and applying a fixed reference signal to the other input of the differential amplifier.

13. The method according to claim 12, wherein applying the fixed reference signal comprises sampling and holding a reference voltage.

14. The method according to claim 13, wherein said sampling is performed during autozeroing of the pixel array.

15. A circuit, comprising:
a pixel element configured to output a voltage signal;
a first capacitor connected to receive the voltage signal;
a second capacitor connected to receive a ramping reference voltage signal; and
a differential comparator having a first input connected to receive a summed output from the first and second capacitors and having a second input connected to receive for receiving a fixed reference voltage.

16. The circuit of claim 15 further comprising a sample and hold circuit for generating the fixed reference voltage.

17. The circuit of claim 15 further comprising:
a third capacitor connected to receive a signal output from the differential comparator;
an inverter circuit having an input connected to receive an output from the third capacitor; and
a feedback switching circuit connected between the input of the inverter circuit and an output of the inverter circuit.

18. The circuit of claim 15 further comprising a memory for storing a data signal value output from the inverter circuit.

* * * * *

UNITED STATES PATENT AND TRADEMARK OFFICE
CERTIFICATE OF CORRECTION

PATENT NO. : 8,134,623 B2  
APPLICATION NO. : 12/402397  
DATED : March 13, 2012  
INVENTOR(S) : Matthew Purcell et al.

Page 1 of 1

It is certified that error appears in the above-identified patent and that said Letters Patent is hereby corrected as shown below:

In the Claims:

At column 6, claim number 15, line number 11, please delete the words "for receiving".

Signed and Sealed this  
First Day of May, 2012

David J. Kappos  
*Director of the United States Patent and Trademark Office*